United States Patent
Ziegler et al.

(10) Patent No.: US 8,963,392 B2
(45) Date of Patent: Feb. 24, 2015

(54) AXIAL LOAD SHARING BEARING SYSTEM AND ASSOCIATED METHOD OF USE

(75) Inventors: William A. Ziegler, Jefferson City, MO (US); Michael D. Smith, Rogers, AR (US); Charles Richard Langford, Grays Point (AU)

(73) Assignees: Regal Beloit America, Inc., Beloit, WI (US); Regal Beloit Australia Pty., Ltd., Rowville, Victoria (AU)

( * ) Notice: Subject to any disclaimer, the term of this patent is extended or adjusted under 35 U.S.C. 154(b) by 235 days.

(21) Appl. No.: 13/446,532

(22) Filed: Apr. 13, 2012

(65) Prior Publication Data
US 2013/0270945 A1 Oct. 17, 2013

(51) Int. Cl.
*H02K 7/08* (2006.01)
*H02K 5/173* (2006.01)
*H02K 5/16* (2006.01)
*F16C 27/00* (2006.01)
*F16C 27/04* (2006.01)

(52) U.S. Cl.
CPC . *H02K 7/08* (2013.01); *F16C 27/00* (2013.01); *F16C 27/04* (2013.01); *H02K 5/173* (2013.01); *H02K 5/16* (2013.01)
USPC ............. 310/90; 310/268; 384/504; 384/517; 384/490

(58) Field of Classification Search
CPC ........... H02K 5/16; H02K 7/08; H02K 7/173; F16C 27/00; F16C 27/04
USPC ...................... 310/90, 268; 384/504, 517, 490
IPC .......................................................... H02K 7/08
See application file for complete search history.

(56) References Cited

U.S. PATENT DOCUMENTS

| | | | | |
|---|---|---|---|---|
| 1,332,444 A | * | 3/1920 | Lindman | 384/517 |
| 3,571,637 A | | 3/1971 | Henningsen et al. | |
| 3,934,957 A | * | 1/1976 | Derner | 384/563 |
| 4,475,185 A | * | 10/1984 | Fujio et al. | 369/265 |
| 4,866,324 A | * | 9/1989 | Yuzawa et al. | 310/268 |
| 4,867,581 A | * | 9/1989 | Schmidt et al. | 384/517 |
| 4,874,976 A | * | 10/1989 | Ohsawa et al. | 310/268 |
| 4,922,162 A | * | 5/1990 | Shiraki et al. | 310/268 |

(Continued)

FOREIGN PATENT DOCUMENTS

| | | |
|---|---|---|
| GB | 1403522 A | 8/1975 |
| GB | 2255452 A | 11/1992 |

(Continued)

OTHER PUBLICATIONS

International Search Report for PCT/US2011/029378 dated Jun. 20, 2011.

*Primary Examiner* — John K Kim
(74) *Attorney, Agent, or Firm* — Thompson Coburn LLP (57) ABSTRACT

An axial flux electric machine and associated method of use that includes a shaft, a rotor attached to the shaft, a plurality of permanent magnets positioned underneath the rotor, an electrical winding positioned below the plurality of permanent magnets, a stator that encircles the shaft that is located below the rotor, a first bearing assembly located below the stator and encircling the shaft of the rotor, a second bearing assembly located below the first bearing assembly and encircling the shaft, and a spring mechanism, located between the first bearing assembly and the second bearing assembly, to distribute load placed on the shaft between the first bearing assembly and the second bearing assembly.

6 Claims, 12 Drawing Sheets

(56) References Cited

U.S. PATENT DOCUMENTS

| | | | |
|---|---|---|---|
| 5,128,574 A * | 7/1992 | Koizumi et al. | 310/90 |
| 5,874,796 A | 2/1999 | Petersen | |
| RE37,261 E * | 7/2001 | Schmider et al. | 417/423.7 |
| 7,554,226 B2 * | 6/2009 | Kojima et al. | 310/51 |
| 7,800,267 B2 * | 9/2010 | Sahara et al. | 310/90 |
| 2004/0080233 A1 * | 4/2004 | Matsushita et al. | 310/257 |
| 2005/0057105 A1 * | 3/2005 | Kasahara | 310/49 R |
| 2006/0220475 A1 * | 10/2006 | Goto et al. | 310/49 R |
| 2010/0019613 A1 | 1/2010 | Saban et al. | |
| 2013/0270945 A1 * | 10/2013 | Ziegler et al. | 310/90 |

FOREIGN PATENT DOCUMENTS

| | | |
|---|---|---|
| WO | 02/03527 A2 | 1/2002 |
| WO | 2011/119574 A1 | 9/2011 |

\* cited by examiner

ABSTRACT

AXIAL LOAD SHARING BEARING SYSTEM AND ASSOCIATED METHOD OF USE

BACKGROUND OF THE INVENTION

A significant application for an electric motor is to operate a pump or a blower. This type of electric motor typically utilizes a permanent magnet electrical motor and would preferably utilize a planar array of magnets. A typical permanent magnet electrical motor can include an alternating current induction motor. One type of alternating induction motor is a radial flux motor, where the flux extends radially outward from the axis of rotation. Another type of electric motor is an electronically commutated motor. An electronically commutated motor may include a permanent magnet alternating current motor, a variable reluctance motor, and a brushless direct current motor. An electronically commutated motor typically operates at a higher efficiency than an alternating current induction motor. There is an axial flux configuration for an electronically commutated motor in which the flux in the air gap extends in a direction that is parallel to the axis of rotation for the rotor of the electronically commutated motor.

The electric motor could rotate an impeller within a pump or blower, which creates a flow of fluid. There are a variety of gas burning appliances that use an electric motor, which includes furnaces, radiant heaters, boilers, water heaters, and pool heaters. This also includes a wide variety of blower applications, where the electric motor powers a blower to move air and/or an air/fuel mixture either through or out of an appliance.

One typical type of axial flux configuration for an electronically commutated motor for the applications above includes an electric motor having a rotor comprising a rotor disk and a plurality of permanent magnets magnetically coupled to the rotor disk. The plurality of permanent magnets include a substantially flat profile and is aligned in a substantially planar array. The electric motor also includes a stator comprising a solid stator core and a plurality of coils each wound around a coil insulating member. The stator core includes a plurality of stator teeth extending substantially parallel to an axis of rotation of the rotor. This type of motor is disclosed in PCT Patent Application Publication No. WO 2011/119574 A1, International Application No. PCT/US2011/029378, which is incorporated herein by reference in its entirety. A major problem with this motor is that the load is placed on a single bearing on the shaft end of the motor. There is also a complex and costly sleeve and opposite end shaft plate. Moreover, the shaft for the rotor is a costly and complex structure to manufacture.

The present invention is directed to overcoming one or more of the problems set forth above.

SUMMARY OF INVENTION

In another aspect of the invention, an axial flux electric machine is disclosed. The axial flux electric machine includes a shaft, a rotor attached to the shaft, a plurality of permanent magnets positioned underneath the rotor, an electrical winding positioned below the plurality of permanent magnets, a stator that encircles the shaft that is located below the rotor, a first bearing assembly located below the stator and encircling the shaft of the rotor, a second bearing assembly located below the first bearing assembly and encircling the shaft, and a spring mechanism, located between the first bearing assembly and the second bearing assembly, to distribute load placed on the shaft between the first bearing assembly and the second bearing assembly.

In another aspect of the invention, an axial flux electric machine is disclosed. The axial flux electric machine includes a shaft, a rotor attached to the shaft, a plurality of permanent magnets positioned underneath the rotor, a plurality of coils positioned below the plurality of permanent magnets, a stator that encircles the shaft that is located below the rotor, a first ball bearing assembly located below the stator and encircling the shaft of the rotor; a second ball bearing assembly located below the first ball bearing assembly and encircling the shaft, a wave spring, located between the first bearing assembly and the second bearing assembly, to distribute load placed on the shaft between the first bearing assembly and the second bearing assembly, and a motor housing.

Still yet another aspect of the present invention is that a method for utilizing an axial flux electric machine is disclosed. The method includes utilizing a shaft with a rotor attached to the shaft and a plurality of permanent magnets positioned underneath the rotor, an electrical winding positioned below the plurality of permanent magnets, a stator that encircles the shaft that is located below the rotor, a first bearing assembly located below the stator and encircling the shaft of the rotor, a second bearing assembly located below the first bearing assembly and encircling the shaft, and a spring mechanism, located between the first bearing assembly and the second bearing assembly, to distribute load placed on the shaft between the first bearing assembly and the second bearing assembly.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings.

BRIEF DESCRIPTION OF DRAWINGS

For a better understanding of the present invention, reference may be made to the accompanying drawings in which.

Reference characters in the written specification indicate corresponding items shown throughout the drawing figures.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as to obscure the present invention.

Figure 1:
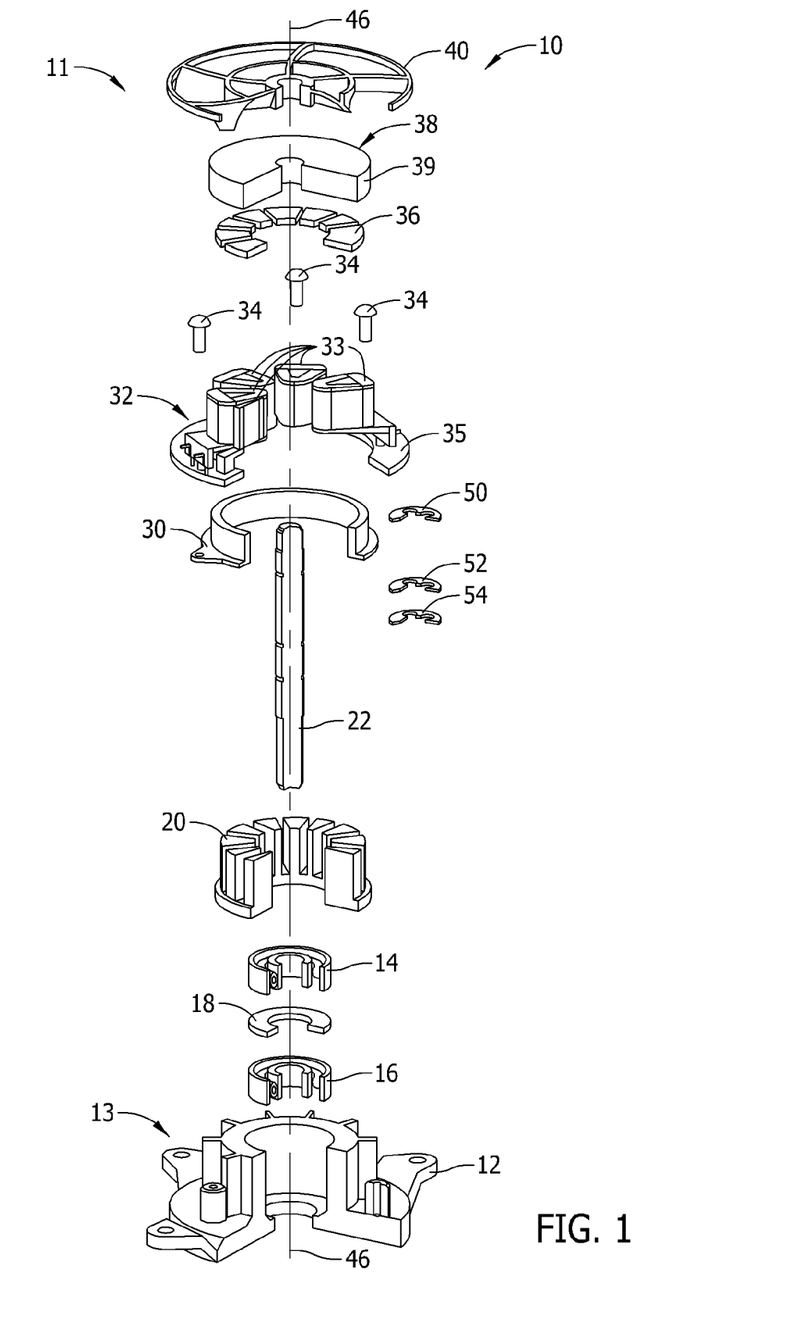
FIG. 1 is a partial cut-away, exploded side view of axial load sharing motor assembly of the present invention.
Figure 2:
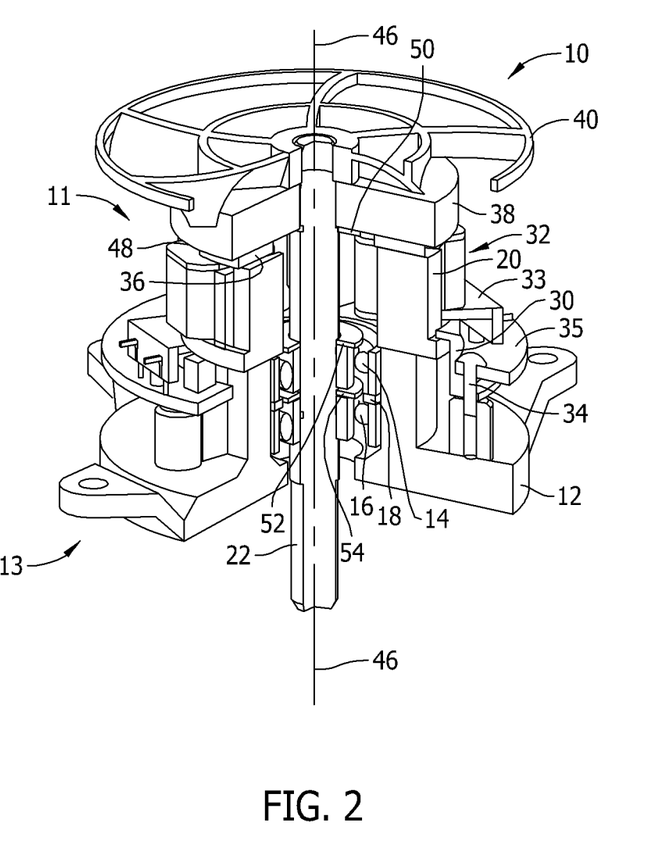
FIG. 2 is the partial cut-away, assemblied view of the axial load sharing motor assembly of the present invention shown in FIG. 1.

Referring now to FIGS. 1 and 2, an axial flux load sharing machine of the present invention is generally indicated by numeral 10. FIG. 1 is an exploded, partially cut-away view of the axial flux load sharing machine 10 and FIG. 2 is a partially cut-away view of the axial flux load sharing machine 10. Components common to FIGS. 1 and 2 are identified with the same reference numerals. Components are described herein as including a top surface 11 generally facing what is referred to herein as a top of the axial flux load sharing electric machine 10, and a bottom surface 13 generally facing what is referred to herein as a bottom of axial flux load sharing electric machine 10. In the exemplary embodiment, electric machine 10 is an electric motor, although, electric machine 10 may operate as either an electric motor or an electric generator. In the exemplary embodiment, electric machine 10 includes a housing (not shown), a rotor 39, a bobbin assembly 32, a stator core 20, a stator core retaining spring, e.g., ring, 30, a first bearing assembly, e.g., ball bearing, 14, a second bearing assembly, e.g., ball bearing, 16, and a spring mechanism, e.g., wave spring, 18 positioned between the first bearing assembly, e.g., ball bearing, 14, and the second bearing assembly, e.g., ball bearing, 16. This is followed by an end shield, e.g., motor housing, 12.

In the exemplary embodiment, there is a rotor assembly 38 that includes a rotor 39 coupled to a shaft 22. The rotor 39 is positioned adjacent to and directly above a plurality of permanent magnets 36. The rotor assembly 38 is rotatable within the machine 10, and more specifically, rotatable within the first bearing assembly, e.g., ball bearing, 14, the second bearing assembly, e.g., ball bearing, 16, and the spring mechanism, e.g., wave spring, 18, about an axis 46 of rotation. Furthermore, in the exemplary embodiment, bobbin assembly 32 includes a plurality of coil insulating members 33 (also referred to herein as bobbins) and a stator core connection board 35.

In the exemplary embodiment, the rotor 39 is manufactured using a sintering process from, for example, Soft Magnetic Alloy (SMA) or Soft Magnetic Composite (SMC) materials. In an alternative embodiment, the rotor 39 is machined and/or cast from, for example, steel.

In the exemplary embodiment, the plurality of permanent magnets 36 are neodymium magnets, although, any suitable permanent magnet may be included that allows the electric machine 10 to function as described herein. An air gap 48 exists between bottom surfaces of the plurality of permanent magnets 36 and top surface of the stator core 20, as shown in FIG. 2. A flux within machine 10 extends between the plurality of permanent magnets 36 and the stator core 20 in a direction parallel to the axis of rotation 46. In the exemplary embodiment, the plurality of permanent magnets 36 is symmetrical, which facilitates manufacturing a single magnet design for use as each of the magnets within the plurality of permanent magnets 36. Furthermore, the plurality of permanent magnets 36 has a substantially flat profile which minimizes waste during manufacturing, and therefore, minimizes cost.

As shown in FIGS. 1 and 2, the shaft 22 is secured in position below the plurality of permanent magnets 36 and the rotor 39 and above the bobbin assembly 32 by a first shaft retaining ring 50. The shaft 22 is also secured in position below the bobbin assembly 32 and the stator core connection board 35 and above the first bearing assembly, e.g., ball bearing, 14 by a second shaft retaining ring 52. Moreover, the shaft 22 is secured in position adjacent to the spring mechanism, e.g., wave spring, 18. The top of the shaft 22 is rotatably connected to a fan 40.

Figure 3:
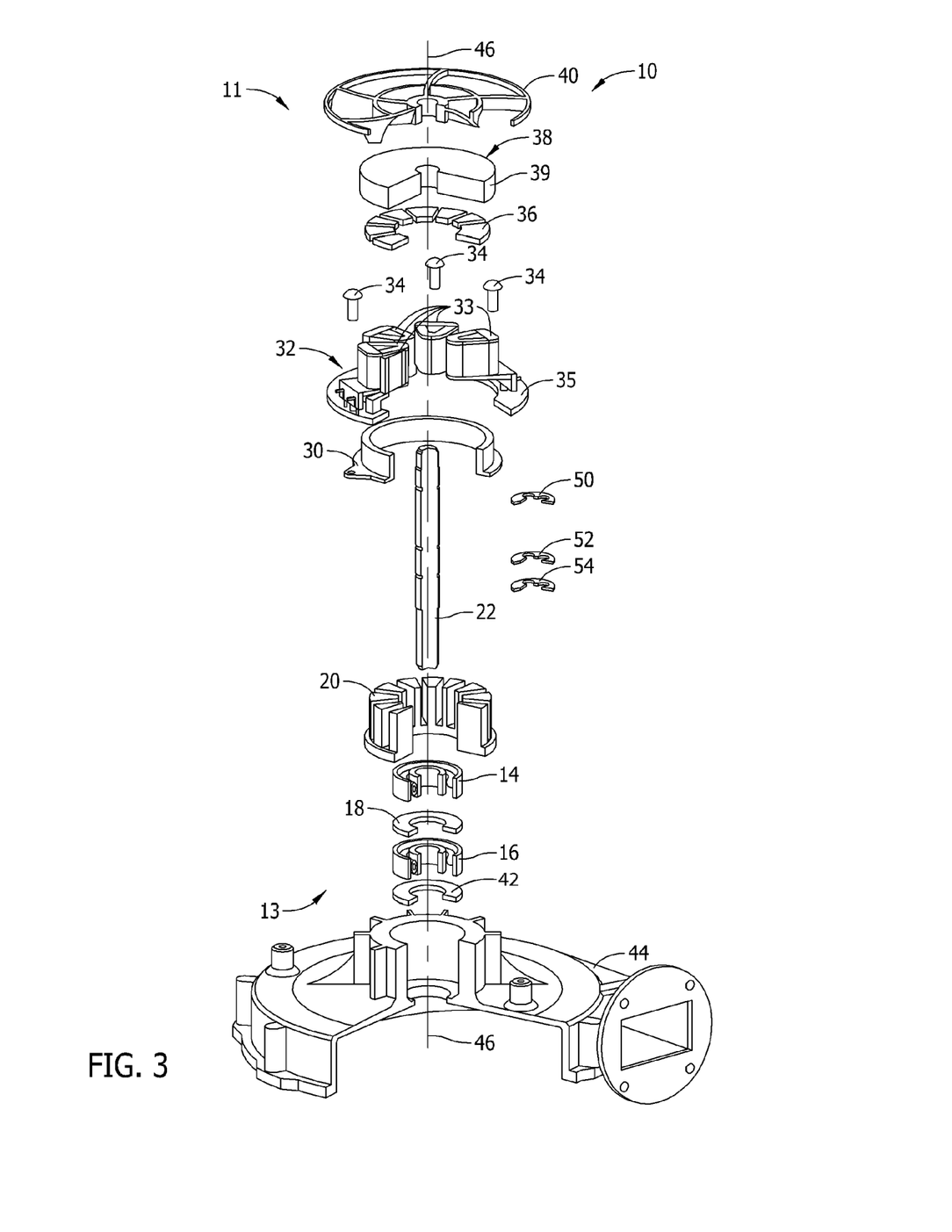
FIG. 3 is a partial cut-away, exploded side view of the axial load sharing motor assembly of the present invention connected to a blower housing.

Referring now to FIG. 3, the same structure shown in FIGS. 1 and 2 is replicated with the sole exception that the axial flux load sharing machine 10 is mounted on a blower housing 44, rather than the motor housing 12, with a seal washer 42 located between the blower housing 44 and the second bearing assembly, e.g., ball bearing, 16.

In the exemplary embodiment, the axial flux load sharing machine 10 is controlled by a sine drive controller (not shown). The sine drive controller produces essentially sine wave currents in the stator winding phases. Furthermore, in the exemplary embodiment, stator core 20 is formed using a sintering process from an SMC material, an SMA material, and/or a powdered ferrite material. The blower system is configured for use in gas burning appliances, for example, but not limited to, water heaters, boilers, pool heaters, space heaters, radiant heaters, and furnaces.

Figure 4:
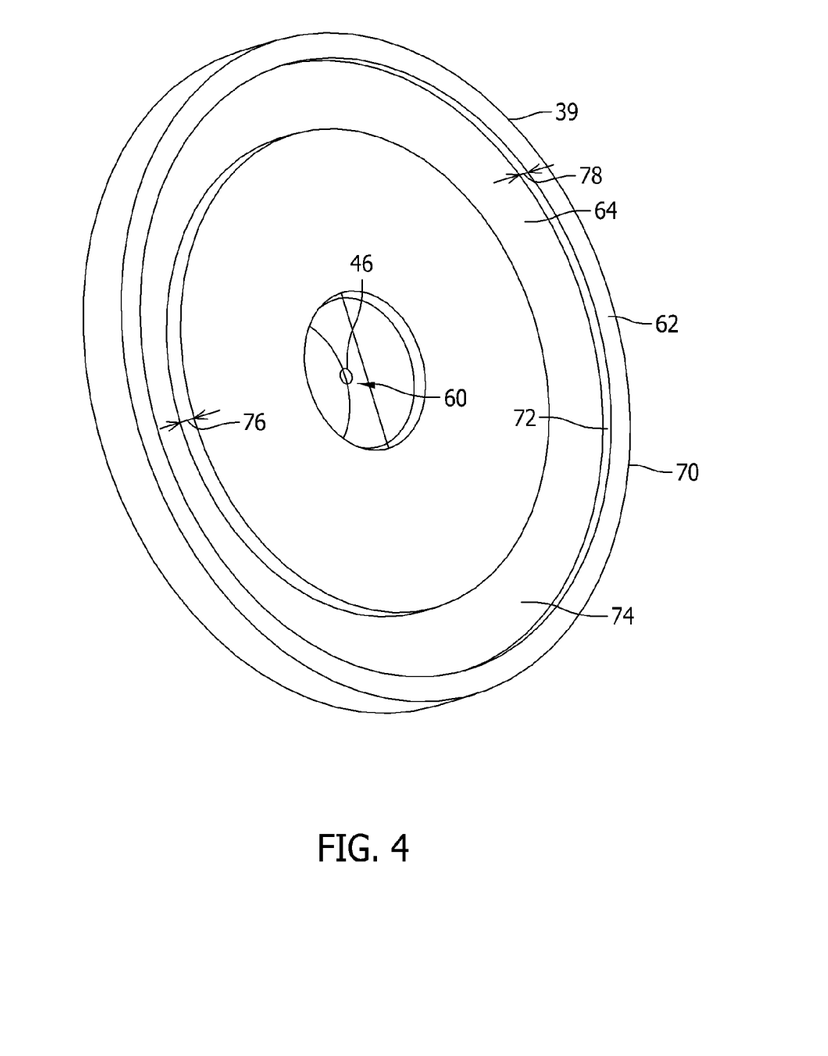
FIG. 4 is a perspective view of an exemplary embodiment of a rotor that may be included within the axial flux machine shown in FIGS. 1, 2 and 3.
Figure 8A:
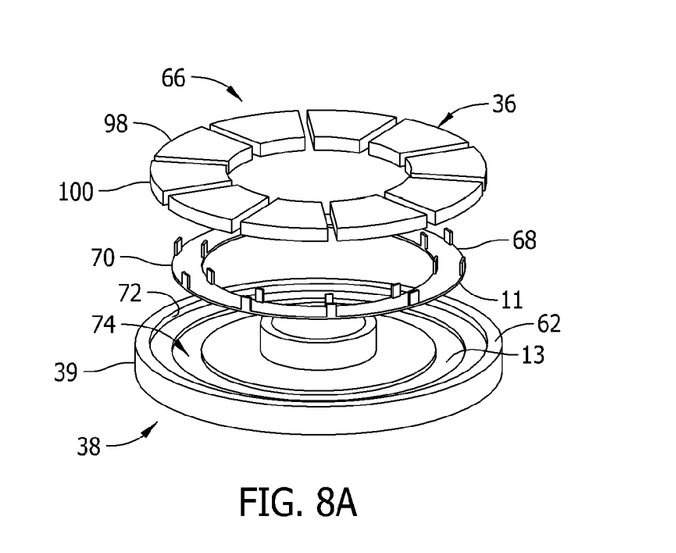
FIG. 8A is a perspective view of an exemplary embodiment of a rotor that may be included within the axial flux machine shown in FIGS. 1, 2 and 3.

FIG. 4 is a perspective view of an exemplary embodiment of a rotor 39 that may be included within axial flux load sharing machine 10 (shown in FIGS. 1, 2 and 3). In the exemplary embodiment, the rotor 39 includes a shaft opening 60. Shaft opening 60 is located around the axis of rotation 46 and is configured to receive a shaft, for example, shaft 22 (shown in FIGS. 1, 2 and 3). The rotor 39 also includes an outer rim 62 that extends axially from bottom surface 64 of the rotor 39. In the exemplary embodiment, outer rim 62 is included within a permanent magnet retention system 66, as shown in FIG. 8A. Permanent magnet retention system 66 includes outer rim 62 and a magnet retention ring 68 (shown in FIG. 5). Outer rim 62 includes an outer edge 70 and an inner edge 72. In the exemplary embodiment, the rotor 39, and more specifically, bottom surface 64, includes a recessed area 74. Recessed area 74 is a ring-shaped area having a depth 76. Recessed area 74 and outer rim 62 are concentric. In the exemplary embodiment, outer rim 62 extends a distance 78 from recessed area 74, wherein distance 78 is greater than depth 76.

Figure 5:
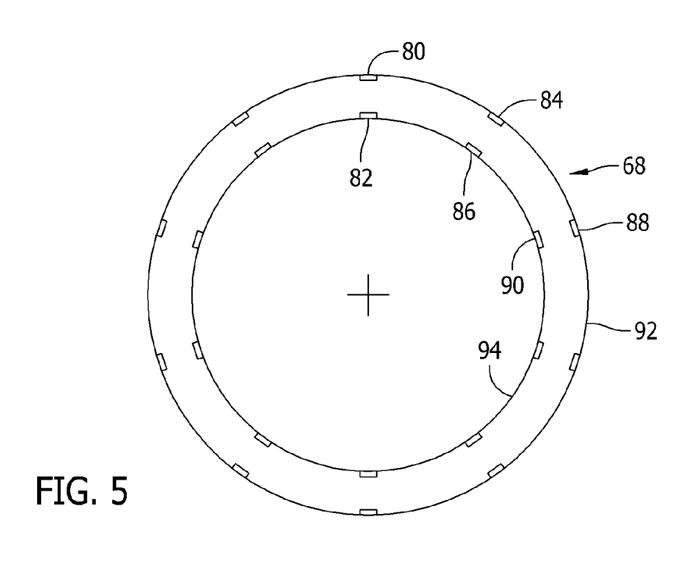
FIG. 5 is a bottom view of an exemplary embodiment of a magnet retention ring that may be included within the axial flux machine shown in FIGS. 1, 2 and 3.
Figure 6:
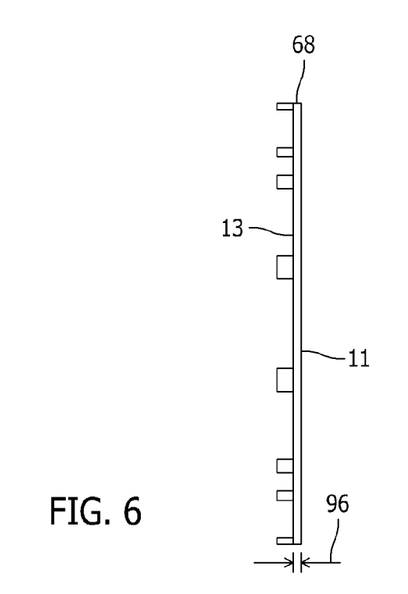
FIG. 6 is a side view of the magnet retention ring shown in FIG. 5.
Figure 7:
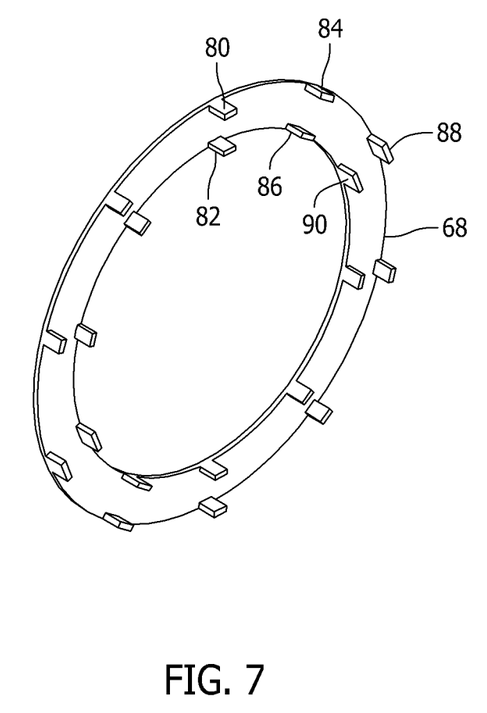
FIG. 7 is a perspective view of the magnet retention ring shown in FIG. 5 and FIG. 6.

FIG. 5 is a bottom view of an exemplary embodiment of magnet retention ring 68. FIG. 6 is a side view of magnet retention ring 68. FIG. 7 is a perspective view of magnet retention ring 68. In the exemplary embodiment, magnet retention ring 68 includes top surface 11 and bottom surface 13, shown in FIG. 6. The magnet retention ring 68 also includes a plurality of magnet alignment features, for example, tabs 80, 82, 84, 86, 88, and 90. Tabs 80, 82, 84, 86, 88, and 90 are configured to maintain a position of the plurality of permanent magnets 36 relative to the rotor 39. The magnet retention ring 68 includes an outer edge 92 and an inner edge 94.

In at least some embodiments, magnet retention ring 68 is manufactured from iron, steel, non-ferrous metal, and/or molded plastic. However, magnet retention ring 68 may be manufactured from any material that allows axial flux load sharing machine 10 to function as described herein. Furthermore, magnet retention ring 68 may be stamped, forged, blanked, or formed using any other suitable process to create a thin ring. Although described above as including a plurality of tabs 80, 82, 84, 86, 88, and 90, magnet retention ring 68 may include ribs, folded fingers, or any similar feature that facilitates maintaining the position of the plurality of permanent magnets 36 and keeping the plurality of permanent magnets 36 separated. The tabs, ribs, fingers, or other separation features are configured such that they do not cause magnetic shorting of the magnetic fields produced by the plurality of permanent magnets 36. For example, the separation features may be sized such that shorting of the magnetic fields is minimized. Alternatively, non-ferrous and/or molded plastic separation features may be included, which will not cause shorting of the magnetic fields.

In at least some embodiments, magnet retention ring 68 has a thickness 96 (shown in FIG. 6) that is substantially similar to depth 76 (shown in FIG. 4). Substantially matching thickness 96 of magnet retention ring 68 and depth 76 of recessed area 74 minimizes an air gap between the plurality of permanent magnets 36, magnet retention ring 68, and rotor 39. Such an air gap may reduce a torque constant generated by the rotor assembly 38.

Figure 8B:
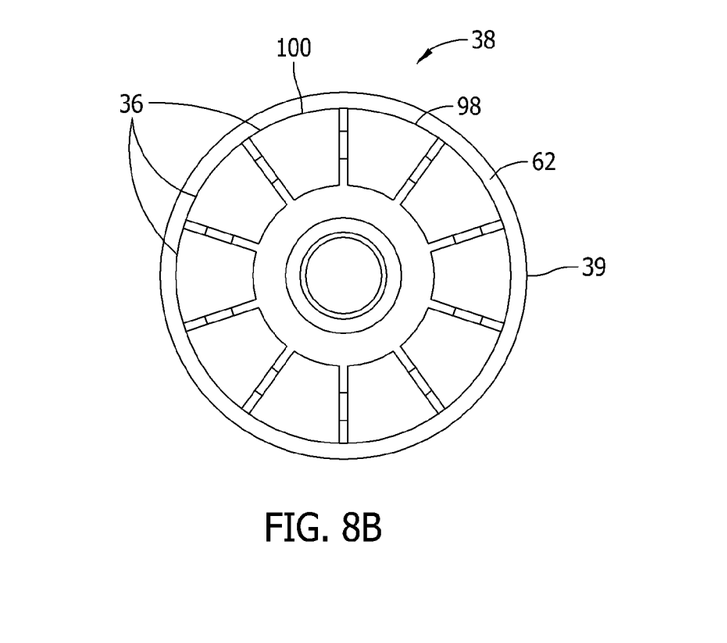
FIG. 8B is a top view of the rotor shown in FIG. 8A.
Figure 8C:
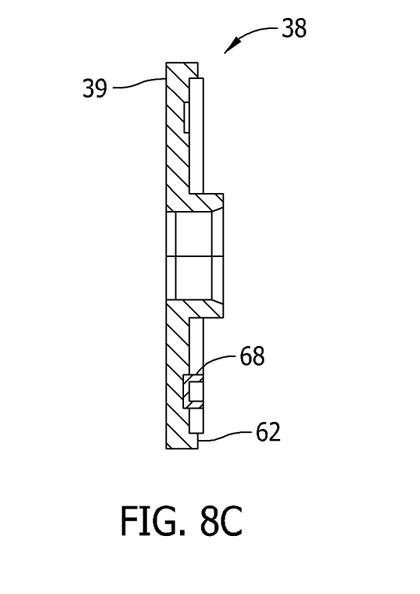
FIG. 8C is a side view of the rotor shown in FIG. 8A.
Figure 8D:
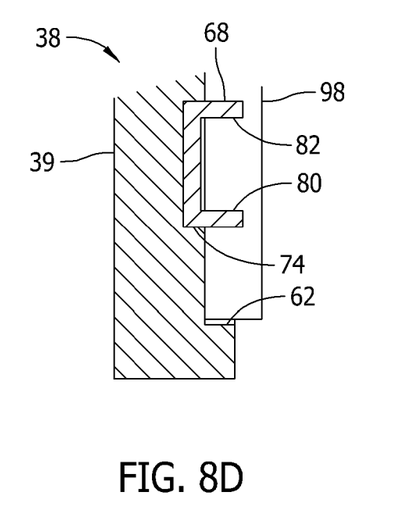
FIG. 8D is a side view of a portion of the rotor shown in FIG. 8A.

FIG. 8A is a perspective view of an exemplary embodiment of the rotor assembly 38 (shown in FIGS. 1, 2 and 3). FIG. 8B is a top view of an exemplary embodiment of the rotor assembly 38. FIG. 8C is a side view of an exemplary embodiment of the rotor assembly 38. FIG. 8D is a side view of a portion of the rotor assembly 38 shown in FIG. 8C. In the exemplary embodiment, the rotor assembly 38 includes the plurality of permanent magnets 36 and magnet retention ring 68 coupled to a rotor 39. The plurality of permanent magnets 36 includes a first permanent magnet 98 and a second permanent magnet 100. In the exemplary embodiment, the rotor assembly 38 includes ten permanent magnets, evenly spaced around the rotor 39. Other embodiments of the rotor assembly 38 include any suitable number of permanent magnets that allow the axial flux load sharing machine 10 to function as described here.

In the exemplary embodiment, at least a portion of magnet retention ring 68 fits within recessed area 74 (shown in FIG. 4). More specifically, top surface 11 (shown in FIG. 6) of magnet retention ring 68 is positioned adjacent to bottom surface 13 of the rotor 39. Outer edge 70 of magnetic retention ring 68 may be positioned adjacent to inner edge 72 of outer rim 62. Alternatively, outer edge 70 of magnetic retention ring 68 may be positioned adjacent to an inner edge of recessed area 74. Magnet retention ring 68 may be secured adjacent to the rotor 39 by a magnetic force that couples the plurality of permanent magnets 36 to the rotor 39. Magnet retention ring 68 may also be coupled to the rotor 39 using an adhesive. The adhesive is not necessary to retain magnet retention ring 68 within recessed area 74, however, the adhesive may reduce fretting corrosion due to vibration during operation.

When the rotor 39 rotates about axis 46 (shown in FIGS. 1, 2 and 3), forces act on the plurality of permanent magnets 36. Outer rim 62 prevents the plurality of permanent magnets 36 from moving radially outward. Tabs 80, 82, 84, 86, 88, and 90 maintain spacing between the plurality of permanent magnets 36. In other words, tabs 80, 82, 84, 86, 88, and 90 prevent first permanent magnet 98 from moving in a tangential direction relative to the rotor 39. Furthermore, tabs 80, 82, 84, 86, 88, and 90 and outer rim 62 eliminate the need for an adhesive to retain the plurality of permanent magnets 36 in the shaft axis direction while holding the plurality of permanent magnets 36 in the radial and tangential directions. An adhesive may be used to prevent fretting corrosion due to vibration during operation or to couple the plurality of permanent magnets 36 to the rotor disk 39 during handling and assembly of the axial flux load sharing machine 10.

Figure 9:
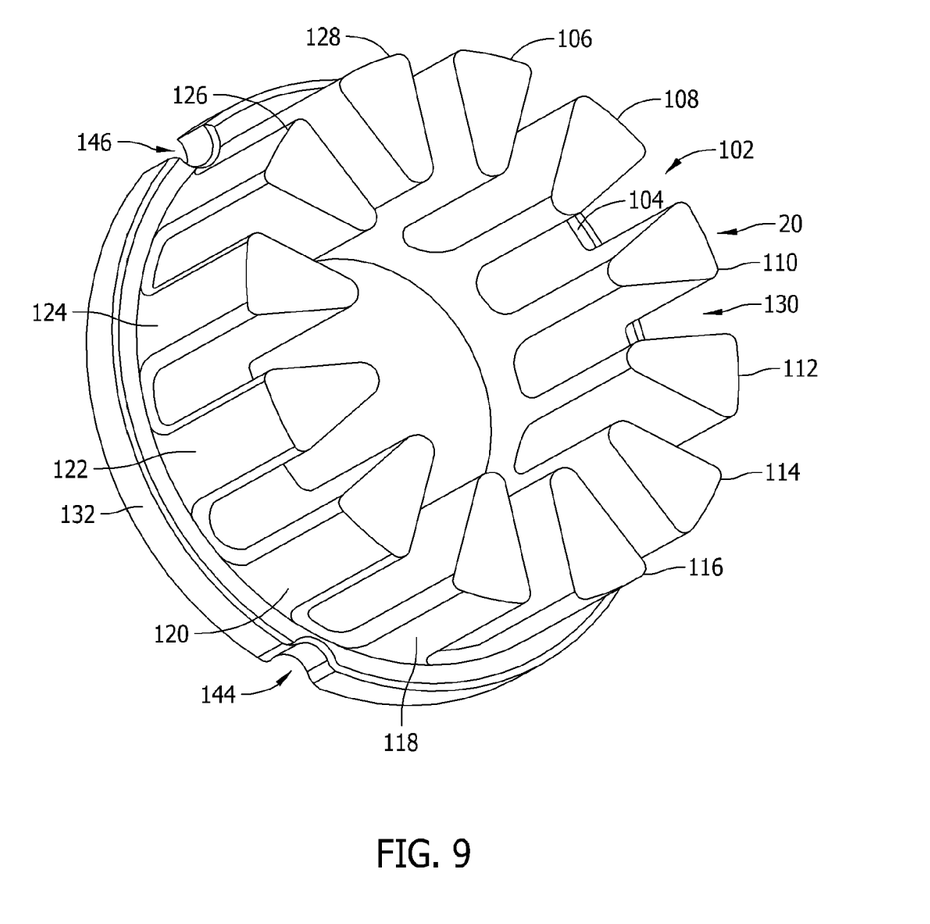
FIG. 9 is a perspective view of an exemplary embodiment of a stator core that may be included within the axial flux machine shown in FIGS. 1, 2 and 3.

FIG. 9 is a perspective view of an exemplary embodiment of stator core 20 (shown in FIGS. 1, 2 and 3). In the exemplary embodiment, stator core 20 includes a plurality of stator core teeth 102 that extend in an axial direction (i.e., parallel to axis of rotation 46, shown in FIGS. 1, 2 and 3) from a stator core base 104. In the exemplary embodiment, the plurality of stator core teeth 102 includes a first tooth 106, a second tooth 108, a third tooth 110, a fourth tooth 112, a fifth tooth 114, a sixth tooth 116, a seventh tooth 118, an eighth tooth 120, a ninth tooth 122, a tenth tooth 124, an eleventh tooth 126 and a twelfth tooth 128. Although described as including twelve teeth, stator core 20 may include any suitable number of teeth that allow axial flux load sharing machine 10 to function as described herein. In use, stator core base 104 is disposed perpendicularly about rotational axis 46 and the plurality of stator core teeth 102 extend axially from stator core base 104 and form a slot 130 between each adjacent tooth of the plurality of teeth 102. In the exemplary embodiment, stator core 20 includes a flange 132 extending at least partially around an outside diameter of stator core 20. Flange 132 may extend entirely around stator core 20, or may extend only partially around stator core 20. Flange 132 may also include a first section extending partially around stator core 20 and a second section extending partially around stator core 20. Flange 132 may include any number of sections that allows the axial flux load sharing machine 10 to function as described herein.

Figure 10:
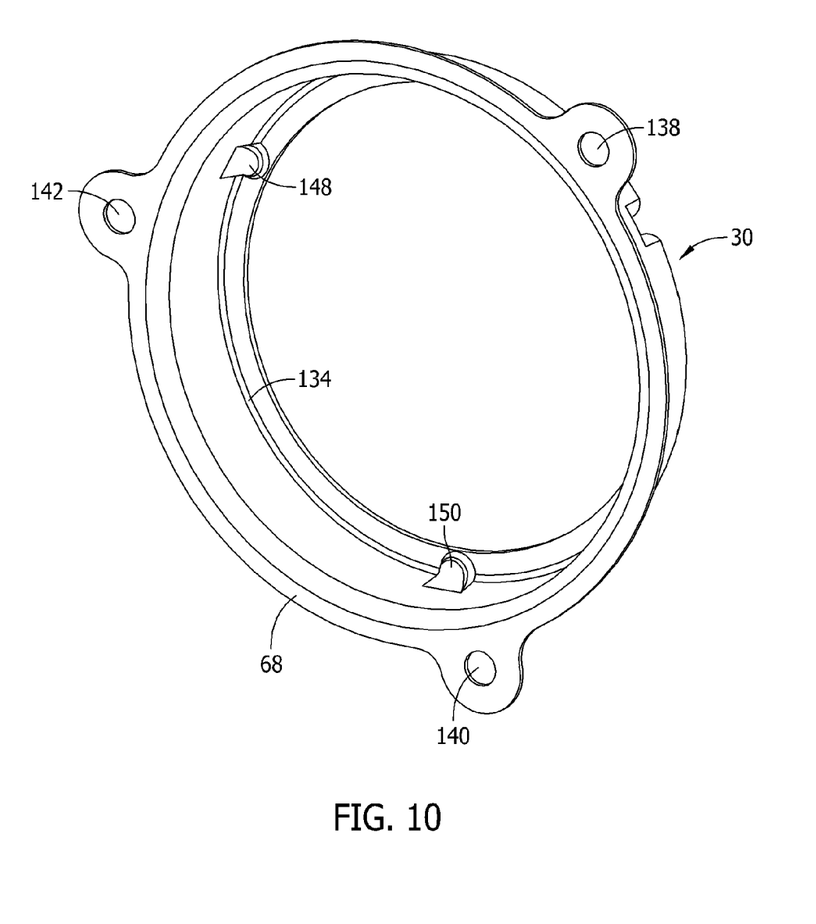
FIG. 10 is a perspective view of an exemplary embodiment of a stator retention ring that may be included within the axial flux machine shown in FIGS. 1, 2 and 3.

FIG. 10 is a perspective view of an exemplary embodiment of magnetic retention ring 68 (shown in FIGS. 1, 2 and 3). In the exemplary embodiment, magnetic retention ring 68 includes a lip 134. Lip 134 may extend entirely around magnetic retention ring 68, or may extend only partially around magnetic retention ring 68. Furthermore, lip 134 may include a first section and a second section, each extending partially around magnetic retention ring 68. Bottom surface 64 of lip 134 is configured to align with flange 132 of stator core 20. When stator core retaining spring, e.g., ring, 30 is positioned around stator core 20 and is coupled to motor housing 12 (shown in FIG. 1), stator core 20 is secured between stator core retaining spring, e.g., ring, 30 and the motor housing 12. In the exemplary embodiment, stator core retaining spring, e.g., ring, 30 includes a first fastener opening 138, a second fastener opening 140, and a third fastener opening 142. Fastener openings 138, 140, and 142 align with openings within motor housing 12 (shown in FIG. 1) with the plurality of attachment mechanisms, e.g., screws, 34 (shown in FIGS. 1, 2 and 3), for example, a threaded fastener, 34 to couple stator core retaining spring, e.g., ring, 30 to the motor housing 12. Although described as using screws for the attachment mechanisms 34 to couple the stator core retaining spring, e.g., ring, 30 to the motor housing 12, any type of suitable fastener may be used that allows axial flux load sharing machine 10 to function as described herein.

In the exemplary embodiment shown in FIG. 9, flange 132, in combination with stator core retaining spring, e.g., ring, 30 enables stator core 20 to be coupled to the motor housing 12 (shown in FIG. 1) without an adhesive between the stator core 20 and the motor housing 12 or threaded fasteners passing directly through and/or into stator core 20 and into the motor housing 12. In other words, stator core 20 is coupled to the motor housing 12 without the need for adhesives or screws into the stator core 20. Securing stator core 20 in position adjacent to the motor housing 12 in this manner facilitates increasing reliability when compared to adhesively coupling stator core 20 to the motor housing 12. The stator core retaining spring, e.g., ring, 30 prevents damage to stator core 20 that may be caused by using, for example, a threaded fastener into or through stator core 20 due to the relatively weak stator core material, which also leaves stator core 20 prone to thread failure.

In the exemplary embodiment shown in FIG. 9, stator core 20 includes a plurality of alignment features, for example, a first notch 144 and a second notch 146. Furthermore, in the exemplary embodiment, stator core retaining spring, e.g., ring, 30 includes a plurality of corresponding alignment features, for example, a first protrusion 148 and a second protrusion 150, shown in FIG. 10, configured to align with first notch 144 and the second notch 146, respectively. The alignment features within stator core 20 and stator core retaining spring, e.g., ring, 30 prevent stator core 20 from rotating due to magnetic forces present during operation of axial flux load sharing machine 10. Furthermore, the alignment features provide positive rotational alignment of stator core 20 within the axial flux load sharing machine 10 during assembly of axial flux load sharing machine 10. The stator core retaining spring, e.g., ring, 30 may be manufactured from a variety of metals or plastics with elastic or non-elastic properties to absorb manufacturing tolerance accumulation.

In the exemplary embodiment, stator core 20 is a solid core. More specifically, as defined herein, a solid core is a non-laminated core. Furthermore, a solid core may be a complete, one-piece component, or may include multiple non-laminated sections coupled together to form a complete solid core. For example, stator core 20 may be constructed of an SMC or an SMA material. Such materials allow for three dimensional flux paths and facilitate reducing high frequency losses (e.g., losses at frequencies above 60 Hz) when compared with laminated stator cores. Use of the sintered SMC or SMA also facilitates increasing control of air gap 48 (shown in FIG. 3) which improves performance and minimizes noise.

Figure 11:
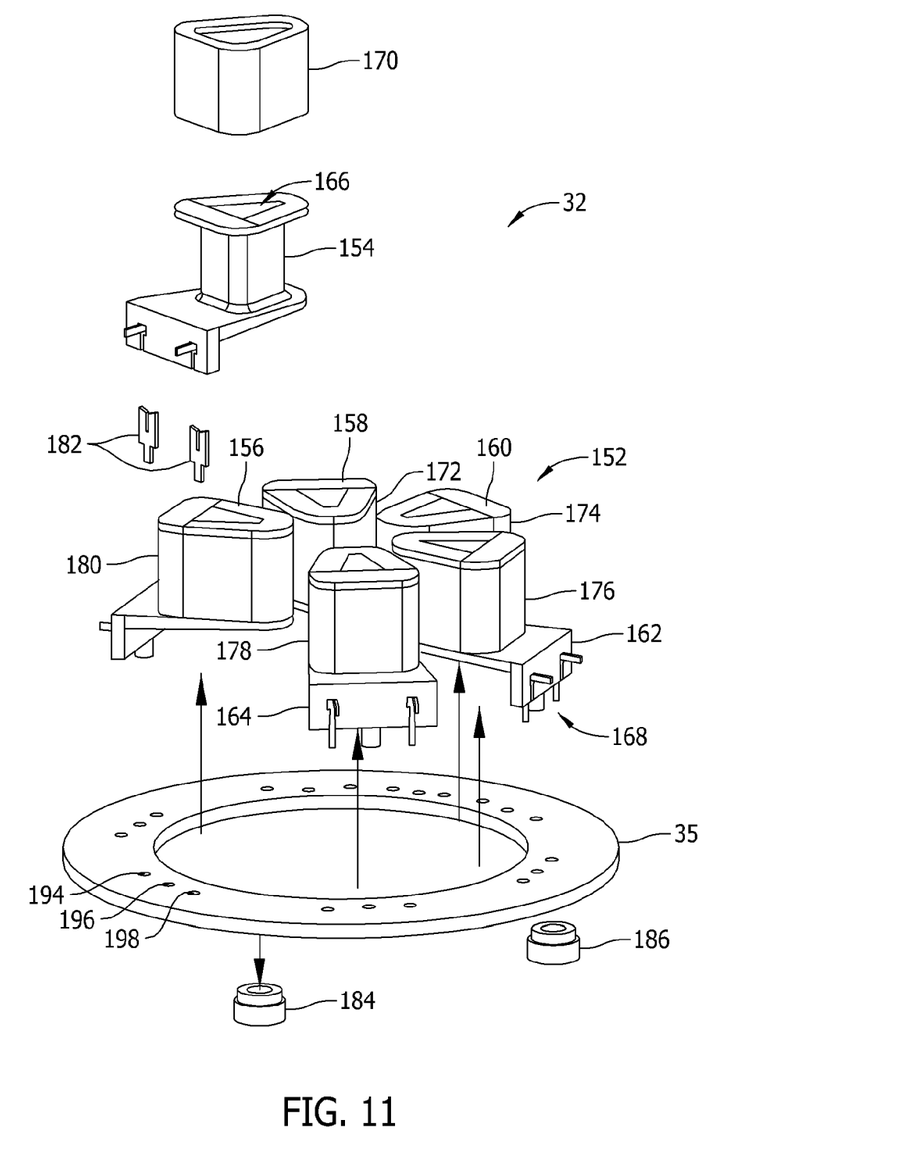
FIG. 11 is an exploded view of an exemplary embodiment of a bobbin assembly that may be included within the axial flux machine shown in FIGS. 1, 2 and 3.

FIG. 11 is an exploded view of an exemplary embodiment of bobbin assembly 32, shown in FIGS. 1, 2 and 3. In the exemplary embodiment, bobbin assembly 32 includes the plurality of bobbins 152 and the stator core connection board 35. In the exemplary embodiment, the plurality of bobbins 152 includes a first bobbin 154, a second bobbin 156, a third bobbin 158, a fourth bobbin 160, a fifth bobbin 162, and a sixth bobbin 164. Although described as including six bobbins, bobbin assembly 32 may include any number of bobbins that allows axial flux load sharing machine 10 to function as described herein. Each of bobbins 154, 156, 158, 160, 162, and 164 include an opening 166 that closely conforms to an external shape of the plurality of stator core teeth 102 (shown in FIG. 4). Referring to FIGS. 9 and 11, the first tooth 106 is configured to be positioned at least partially within opening 166 of first bobbin 154. Furthermore, third stator tooth 110 is configured to be positioned at least partially within opening 166 of second bobbin 156. The axial flux load sharing machine 10 may include one bobbin per tooth, or one bobbin positioned on every other tooth.

In the exemplary embodiment, bobbin assembly 32 also includes an electrical winding 168 that includes a plurality of coils, for example, a first coil 170, a second coil 172, a third coil 174, a fourth coil 176, a fifth coil 178, and a sixth coil 180.

In the exemplary embodiment, electrical winding 168 is made up of the six coils 170, 172, 174, 176, 178, and 180 and creates a twelve-pole stator. Each coil 170, 172, 174, 176, 178, and 180 is wound around a respective bobbin 154, 156, 158, 160, 162, and 164. Each bobbin 154, 156, 158, 160, 162, and 164 electrically isolates one of coils 170, 172, 174, 176, 178, and 180 from a respective stator tooth of the plurality of stator teeth 102.

In the exemplary embodiment, coils 170, 172, 174, 176, 178, and 180 are wound around bobbins 154, 156, 158, 160, 162, and 164. Each of coils 170, 172, 174, 176, 178, and 180 include two ends, a start and a finish to the coil. The bobbins 154, 156, 158, 160, 162, and 164 are coupled to stator core connection board 35. In the exemplary embodiment, stator core connection board 35 is a printed circuit board (PCB). In the exemplary embodiment, each end of each of coils 170, 172, 174, 176, 178, and 180 is coupled to stator core connection board 35 using an insulation displacement terminal 182 designed for directly soldering into stator core connection board 35. In at least some embodiments, insulation displacement terminal 182 may be a Siameze terminal manufactured by Tyco Electronics Ltd., although, any other suitable connector may be used that allows the plurality of bobbins 152 to be coupled to stator core connection board 35 as described herein. In the exemplary embodiment, bobbin assembly 32 is manufactured as a complete component using printed circuit board processes using through-hole technology. In the exemplary embodiment, insulation displacement terminals 182 facilitate electrically coupling each of coils 170, 172, 174, 176, 178, and 180 to stator core connection board 35, and also mechanically coupling each of the plurality of bobbins 152 to stator core connection board 35 before and after soldering. In the exemplary embodiment, stator core connection board 35 includes a standard wiring connector (not shown in FIG. 11) for directly connecting stator core connection board 35 to a motor control board. In an alternative embodiment, stator core connection board 35 is incorporated within a motor control board, thereby eliminating redundant mounting and connectors. Moreover, in the exemplary embodiment, bobbin assembly 32 also includes at least one spacer, for example, first spacer 184 and a second spacer 186. First spacer 184 and second spacer 186 are coupled to stator core connection board 35 and maintain a distance between stator core connection board 35 and motor housing 12. In some embodiments, spacers 184 and 186 each include an opening configured to allow a fastener to pass through.

Figure 12:
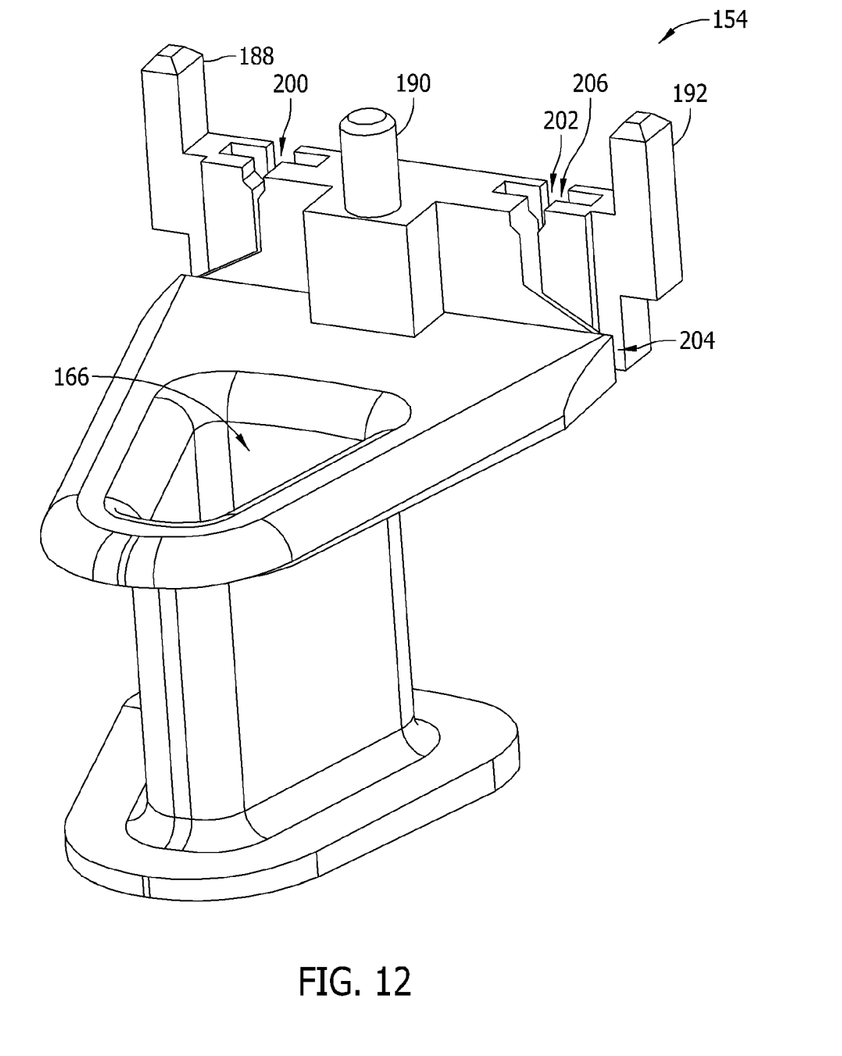
FIG. 12 is a perspective view of an exemplary embodiment of a bobbin that is included within the bobbin assembly shown in FIG. 11.

FIG. 12 is a perspective view of an exemplary embodiment of bobbin 154, also shown in FIG. 11. In the exemplary embodiment, bobbin 154 includes a first alignment post 188, a second alignment post 190, and a third alignment post 192. Alignment posts 188, 190, and 192 are configured to interact with corresponding stator core connection board 35 features, for example, a first opening 194, a second opening 196, and a third opening 198 (shown in FIG. 11). Posts 188, 190, and 192 in combination with first opening 194, second opening 196, and third opening 198, facilitate proper coupling of the first bobbin 154 and stator core connection board 35. Although described as including three alignment posts, the first bobbin 154 may include any number of alignment posts that allow the first bobbin 154 to be properly aligned with stator core connection board 35.

In the exemplary embodiment, bobbin 154 also includes a first terminal opening 200 and a second terminal opening 202. Each terminal opening 200 and 202 is configured to receive at least a portion of insulation displacement terminal 182. A first end (not shown in FIG. 12) of coil 170 is positioned at least partially within a first slit 204 and at least partially within a second slit 206. Slit 206 is perpendicular to second terminal opening 202. Second slit 206 facilitates aligning the first end of coil 170 in a manner that allows insulation displacement terminal 182 (shown in FIG. 11) to electrically couple with the first end of coil 170 when positioned within second terminal opening 202.

Although described above as including insulation displacement terminals 182, in an alternative embodiment, bobbin assembly 32 does not include insulation displacement terminals 182. In the alternative embodiment, the ends of each of coils 170, 172, 174, 176, 178, and 180 are coupled directly to stator core connection board 35, for example, through an electrical hole in a printed circuit board. The ends are then soldered to complete the electrical circuit and mechanically couple bobbin 154 to stator core connection board 35.

An electric machine described herein includes a rotor comprising a rotor disk and a plurality of permanent magnets magnetically coupled to the rotor disk. The plurality of permanent magnets has a substantially flat profile and is aligned in a substantially planar array. The electric machine also includes a stator comprising a solid stator core and a plurality of coils each wound around a coil insulating member. The stator core includes a plurality of stator teeth extending substantially parallel to an axis of rotation of the rotor.

The electric machine described herein may include a stator connection board, wherein each of the coil insulating members is coupled to the stator connection board. The stator connection board mechanically and electrically couples together the plurality of coils. The electric machine may also include at least one insulation displacement terminal to facilitate coupling the plurality of coils to the stator connection board, wherein the coil insulating member includes an opening configured to receive the at least one insulation displacement terminal. The coil insulating member may include at least one alignment post for aligning the insulation member and the stator connection board.

The electric machine described herein may also include a stator retention ring configured to secure the stator core between the stator retention ring and an end shield of the machine. The stator retention ring may include at least one stator core alignment feature configured to interact with the stator core to prevent rotation of the stator core. Furthermore, the stator core may include at least one stator core alignment feature configured to interact with the stator core retention ring to prevent rotation of the stator core.

Moreover, the rotor may also include a permanent magnet retention system that includes an outer rim integrated within the rotor disk and configured to prevent the plurality of permanent magnets from moving in a radial direction relative to the rotor disk. The permanent magnet retention system may be integrated within the rotor disk. The permanent magnet retention system may also include a permanent magnet retention ring configured to be coupled between the rotor disk and the plurality of permanent magnets. The permanent magnet retention ring is configured to maintain a position of the permanent magnets relative to the rotor disk. The rotor disk further includes at least one balancing opening that facilitates balancing of the rotor. The electric machine described herein may be configured for use in a gas burning appliance.

A method for assembling an electric machine is described herein. The electric machine includes a rotor and a stator. The stator includes a solid stator core that includes a plurality of stator teeth extending substantially parallel to an axis of rotation of the rotor. The method described herein may include magnetically coupling a plurality of permanent magnets to a rotor, wherein the rotor includes a rotor disk and the permanent magnets have a substantially flat profile and are aligned in a substantially planar array. The method may also include winding a coil around each of a plurality of coil insulating members, wherein each of the plurality of coil insulating members includes an opening. The method may also include positioning at least one of the plurality of stator teeth at least partially within the coil insulating member opening.

The method for assembling an electric machine described herein may also include magnetically coupling a permanent magnet retention ring between the rotor disk and the plurality of permanent magnets. Furthermore, the plurality of coil insulating members may be mechanically coupled to a stator connection board, and the plurality of coils may be electrically coupled to the stator connection board. The method for assembling an electric machine may also include coupling the solid stator core to a machine end shield using a stator retention ring. Furthermore, the method may include positioning the electric machine in a gas burning appliance application.

A nonlimiting example of an axial flux electric machine that does not provide load sharing is found in International Application No. PCT/US2011/119574 for "Axial Flux Electric Machine and Methods of Assembling the Same," filed Mar. 22, 2011, claiming a priority of Mar. 22, 2010, which is incorporated by referenced herein, in its entirety.

Furthermore, it should be understood that when introducing elements of the present invention in the claims or in the above description of the preferred embodiment of the invention, the terms "have," "having," "includes" and "including" and similar terms as used in the foregoing specification are used in the sense of "optional" or "may include" and not as "required." Similarly, the term "portion" should be construed as meaning some or all of the item or element that it qualifies.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims that follow.

The invention claimed is:

1. An axial flux electric machine comprising:
a shaft;
a rotor attached to the shaft;
a plurality of permanent magnets positioned underneath the rotor;
an electrical winding positioned below the plurality of permanent magnets;
a stator that encircles the shaft that is located below the rotor;
a motor housing;
a retaining spring that secures the stator to the motor housing;
a first bearing assembly located below the stator and encircling the shaft of the rotor;
a second bearing assembly located below the first bearing assembly and encircling the shaft; and
a spring mechanism, located between the first bearing assembly and the second bearing assembly, to distribute load placed on the shaft between the first bearing assembly and the second bearing assembly.

2. An axial flux electric machine comprising:
a shaft;
a rotor attached to the shaft;
a plurality of permanent magnets positioned underneath the rotor;
an electrical winding positioned below the plurality of permanent magnets;
a stator that encircles the shaft that is located below the rotor;
a motor housing, wherein the shaft is positioned within the motor housing through a plurality of retaining rings;
a first bearing assembly located below the stator and encircling the shaft of the rotor;
a second bearing assembly located below the first bearing assembly and encircling the shaft; and
a spring mechanism, located between the first bearing assembly and the second bearing assembly, to distribute load placed on the shaft between the first bearing assembly and the second bearing assembly.

3. An axial flux electric machine comprising:
a shaft;
a rotor attached to the shaft;
a plurality of permanent magnets positioned underneath the rotor;
an electrical winding positioned below the plurality of permanent magnets;
a stator that encircles the shaft that is located below the rotor;
a motor housing;
a first bearing assembly located below the stator and encircling the shaft of the rotor;
a second bearing assembly located below the first bearing assembly and encircling the shaft;
a seal washer positioned above the motor housing and below the second bearing assembly; and
a spring mechanism, located between the first bearing assembly and the second bearing assembly, to distribute load placed on the shaft between the first bearing assembly and the second bearing assembly.

4. An axial flux electric machine comprising:
a shaft;
a rotor attached to the shaft;
a plurality of permanent magnets positioned underneath the rotor;
a plurality of coils positioned below the plurality of permanent magnets;
a stator that encircles the shaft that is located below the rotor;
a first ball bearing located below the stator and encircling the shaft of the rotor;
a second ball bearing located below the first ball bearing assembly and encircling the shaft;
a wave spring, located between the first bearing assembly and the second bearing assembly, to distribute load placed on the shaft between the first bearing assembly and the second bearing assembly;
a motor housing; and
a retaining spring that secures the stator to the motor housing.

5. An axial flux electric machine comprising:
a shaft;
a rotor attached to the shaft;
a plurality of permanent magnets positioned underneath the rotor;
a plurality of coils positioned below the plurality of permanent magnets;
a stator that encircles the shaft that is located below the rotor;
a first ball bearing located below the stator and encircling the shaft of the rotor;
a second ball bearing located below the first ball bearing assembly and encircling the shaft;
a wave spring, located between the first bearing assembly and the second bearing assembly, to distribute load placed on the shaft between the first bearing assembly and the second bearing assembly;
a motor housing, wherein the shaft is positioned with the motor housing through a plurality of retaining rings.

6. A method of utilizing an axial flux electric machine comprising:
utilizing a shaft with a rotor attached to the shaft and a plurality of permanent magnets positioned underneath the rotor, an electrical winding positioned below the plurality of permanent magnets, a stator that encircles the shaft that is located below the rotor, a motor housing and a retaining spring that secures the stator to the motor housing, a first bearing assembly located below the stator and encircling the shaft of the rotor, a second bearing assembly located below the first bearing assembly and encircling the shaft, and a spring mechanism, located between the first bearing assembly and the second bearing assembly, to distribute load placed on the shaft between the first bearing assembly and the second bearing assembly.

* * * * *